June 5, 1956 — W. R. MORGAN — 2,748,920
GLASSWARE TAKE-OUT MECHANISM
Filed Oct. 10, 1952 — 7 Sheets-Sheet 1

INVENTOR:
WILLIAM R. MORGAN,
By Kingsland, Rogers & Ezell
ATTORNEYS

United States Patent Office 2,748,920
Patented June 5, 1956

2,748,920

GLASSWARE TAKE-OUT MECHANISM

William R. Morgan, Canton, Ohio

Application October 10, 1952, Serial No. 314,023

17 Claims. (Cl. 198—210)

The present invention relates to glassware take-out mechanisms that are used for withdrawing glassware, and particularly glass container ware, such as bottles, from a glass molding machine, and transferring it to some other point, such as to a conveyor by means of which it may be moved to a lehr for further treatment.

In particular, the present invention represents improvements on a glassware take-out mechanism originally the subject of a patent application Serial No. 700,012, filed September 28, 1946, now Patent No. 2,609,943, in the name of Samuel E. Winder, and subsequently the subject of a patent application Serial No. 176,381, filed July 28, 1950, now Patent No. 2,681,135, in the name of Walter V. Vierling. The structure of each of the above-mentioned previous applications, as well as that of the instant application, involves a carriage rotated about a vertical axis, with a plurality of take-out heads extending radially therefrom, which heads move vertically on the carriage during its rotation. Each head has take-out jaws operated to open and closed positions by a pneumatic motor mounted on the head and vertically moved with the head. A control valve for each head is mounted on the carriage so that it does not move vertically. The original application disclosed flexible hoses for connecting the valves and the movable heads. The Vierling application, however, sought to eliminate some of the flexible hose connections and to utilize fluid passages in structural parts of the machine. Another object of the Vierling application was to provide better means for mounting the principal carriage of the take-out mechanism so as to provide vertical adjustment thereof and to provide for rotation of the carriage by its vertical shaft despite relative axial displacement of the carriage on the shaft.

The present application has for its primary object the further improvement of the aforementioned prototype devices, including further improvement in the air passage arrangement and an improved mechanism for adjusting the height of the rotating carriage.

Another important object of the present invention is to provide a glassware take-out mechanism having a rotating carriage which incorporates a hydraulic brake adapted to prevent the carriage from rotating under the influence of lateral cam forces.

Another object of the invention is to provide a glassware take-out device having take-out jaws, the operations of which are controlled by adjustably mounted cams.

Additional improvements and advantages will appear from the description to follow:

In the drawings:

Fig. 21 is a top plan view of a removed support for an "opening" cam;

Fig. 22 is a side elevational view, partly in section, of the cam support of Fig. 21;

Fig. 23 is a top plan view of a removed lower disc which forms a part of the take-out carriage;

Fig. 24 is a top plan view of a removed drive flange for driving the take-out carriage;

Fig. 25 is a top plan view of a removed valve cam;

Fig. 26 is a side elevational view of the cam of Fig. 25;

Fig. 27 is a top plan view of an alternative valve cam;

Fig. 28 is a fragmentary side elevational view of the cam of Fig. 27;

Fig. 29 is a top plan view, partly in section, of a removed upper disc which forms part of the take-out carriage;

Figs. 30, 31 and 32 are enlarged fragmentary sectional elevations taken generally along the lines 30—30, 31—31 and 32—32, respectively, of Fig. 29;

The instant glassware take-out mechanism is similar to its aforementioned prototypes in that it is especially designed for use with a rotating glass bottle forming machine of the type disclosed in a patent application bearing Serial No. 688,470, filed August 5, 1946, in the name of Samuel E. Winder, although it will be understood that the instant mechanism may be used to advantage with other glass forming machines, and the like.

Figures 1, 2, 16, 17:
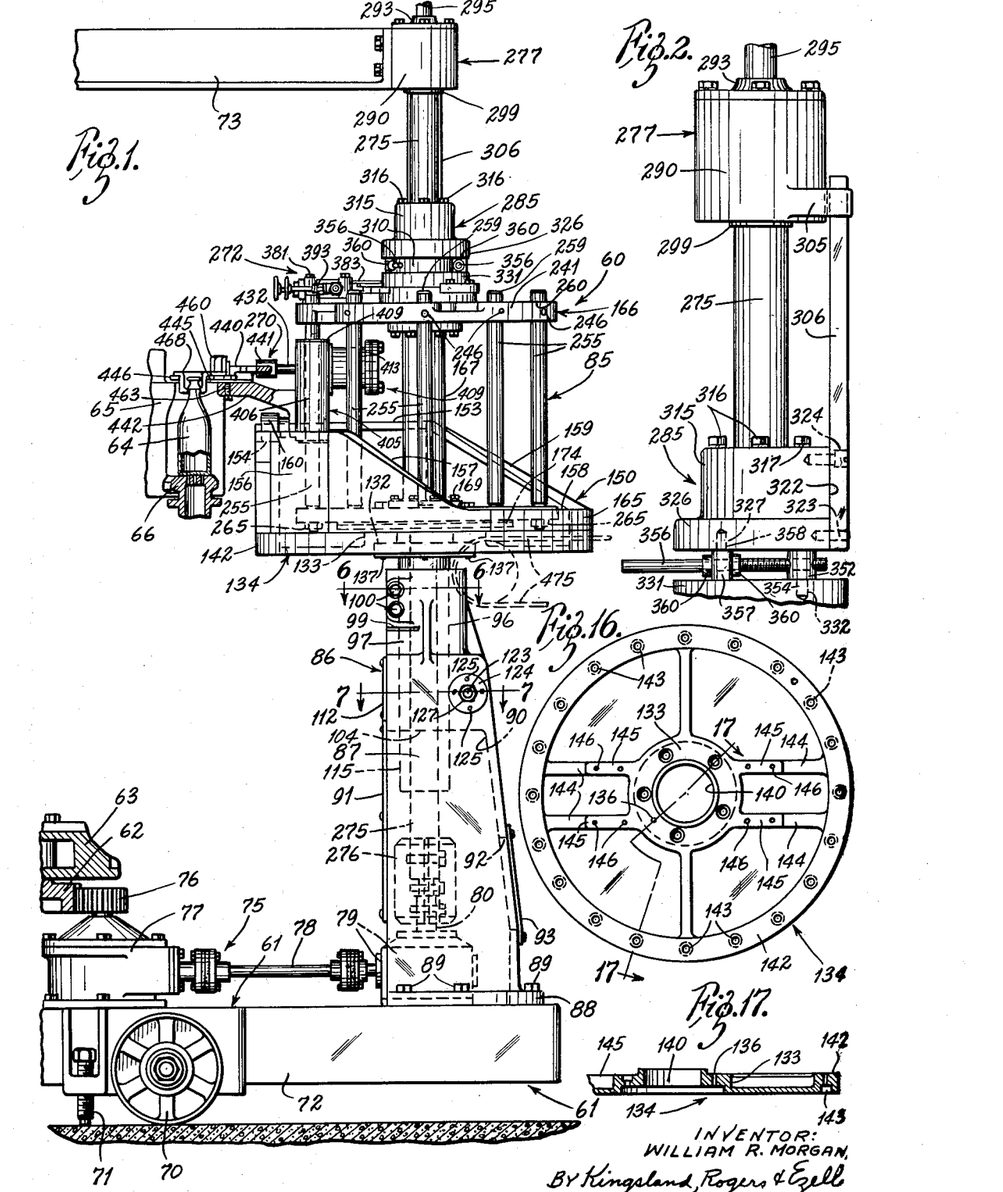
Fig. 1 is a side elevation, partly in section, of a glassware take-out mechanism shown mounted on a fragmentarily depicted bottle forming machine, with all but one of its head assemblies removed for the sake of clarity.
Fig. 2 is an enlarged fragmentary view showing the extreme upper portion of the mechanism of Fig. 1 as viewed from the right-hand side of that figure.
Fig. 16 is a top plan view of a removed cam table.
Fig. 17 is a fragmentary sectional elevation taken generally along the line 17—17 of Fig. 16.
Figures 3, 36, 37, 38, 39:
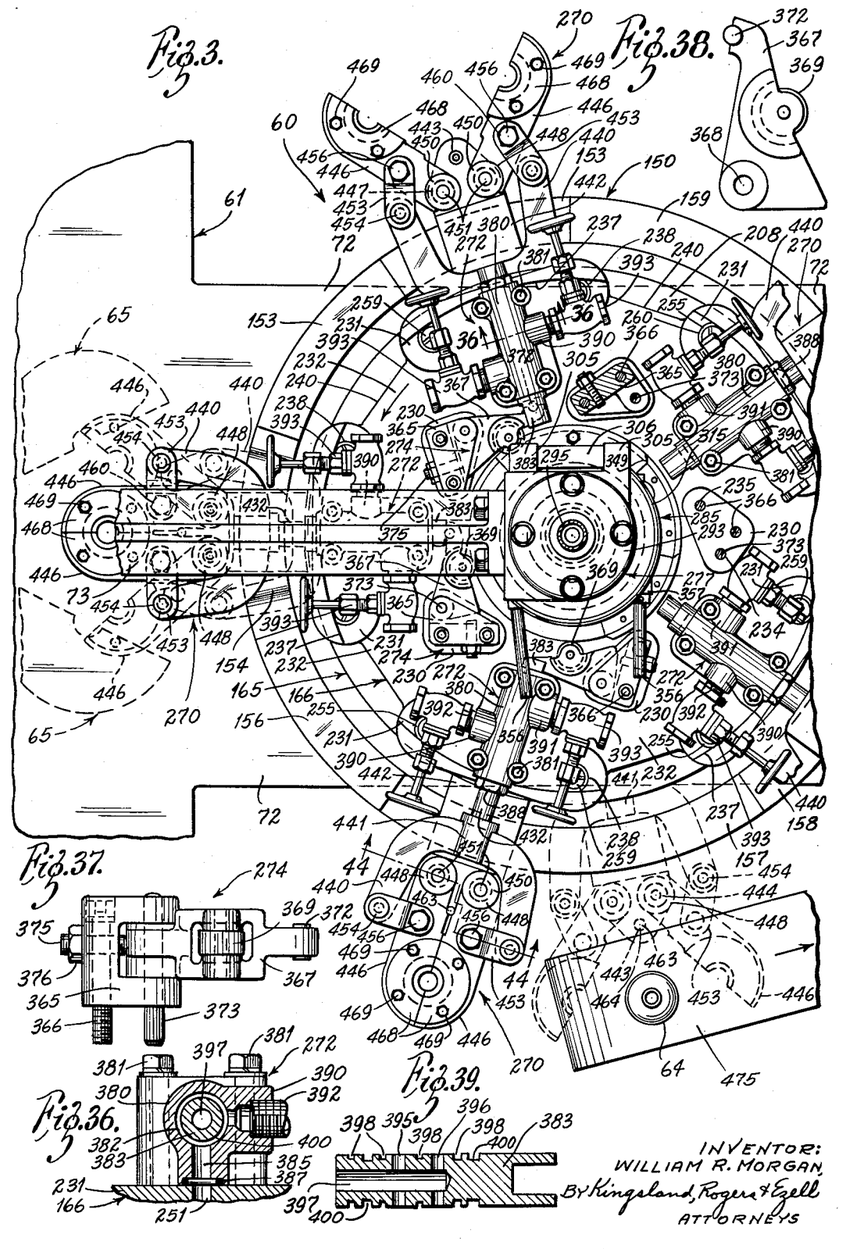
Fig. 3 is an enlarged top plan view of the mounted mechanism of Fig. 1, portions being broken away to conserve space.
Fig. 36 is an enlarged fragmentary sectional elevation through a valve body which controls the action of the take-out jaws, the view being taken generally along the line 36—36 of Fig. 3.
Fig. 37 is a side elevation of a removed valve lever assembly.
Fig. 38 is an enlarged top plan view of a valve lever.
Fig. 39 is a sectional elevation of a removed valve piston.

Fragmentary portions of the above-mentioned bottle forming machine are depicted in Figs. 1 and 3 of the drawings from which it may be seen that the present glassware take-out mechanism, generally designated by the numeral 60, may be mounted on a base 61 which is common to both the mechanism 60 and the glass forming machine with which it is associated.

The bottle forming machine, as set forth in the application above-mentioned, has a central column (not shown) mounted on the base 61 and about which a large externally toothed gear 62 is caused to rotate by an appropriate drive mechanism (not shown). A table 63 mounted to rotate with the gear 62, in turn, mounts glassware forming mechanism (in general, not shown) which is adapted to produce completed glassware at a predetermined location relative to the base 61. Thus, in Fig. 1, there is shown a completely formed glass bottle 64 from the side of which a finish mold 65 has been withdrawn so as to leave the bottle 64 resting upon a mold bottom member 66, from which position the bottle may be removed from the bottle forming machine by the action of the take-out mechanism 60. It will, of course, be understood that the bottle forming machine comprises a plurality of identical molding mechanisms continuously rotating about the aforementioned central column and successively presenting bottles 64 to the position shown in Fig. 1.

The base 61, which is provided with wheels 70 so that it may be moved about and jackscrews 71 so that it may be supported in any desired location, has a projection 72 thereon that constitutes the principal support for the take-out mechanism of this application. Clearly, the mounting of both the take-out mechanism 60 and the bottle forming machine on a common base, such as 61, provides for a fixed disposition of the cooperating elements. The rigidity of the relation between the mechanism 60 and the bottle forming machine is furthered by a cross-arm member 73 secured to the upper end of the mechanism 60 and extending to the aforementioned central column of the bottle forming machine.

The mechanism 60 is appropriately driven from the gear 62 of the bottle forming machine through a driving arrangement generally indicated by the numeral 75, which arrangement is described in detail in an application for Drive For Glassware Take-Out Machine, Serial No. 181,786, filed August 28, 1950, in the name of Samuel E. Winder et al. For the present application, it is sufficient to mention that the gear 62 meshes with a gear 76, the power transmission extending thence through a bevelled gear drive 77, a flexibly coupled connecting shaft 78, and an irreversible worm drive 79, ultimately to rotate a vertical take-off shaft 80. As is obvious from Fig. 1, the driving arrangement 75 is mounted on the base 61 so as to dispose the take-off shaft 80 in appropriate position for connection to the rotating carriage assembly of the take-out mechanism 60. By the foregoing arrangement, the shaft 80, and hence a rotating carriage assembly 85 coupled to the shaft 80 as will appear, will be driven coordinately with the rotation of the bottle forming machine and the finish molds forming a part thereof.

The rotating carriage assembly comprises the principal operating assemblies of the mechanism 60 and is mounted for rotation, as will appear, on a support assembly 86.

The support assembly 86 includes a base 87 having a generally horseshoe-shaped flange 88 at its lower end for securement by means of bolts 89 to the upper surface of the projection 72 of the base 61. The lower and intermediate portions of the base 87 are of more or less channel shape so as to provide a cavity 90, open at its rear, or to the left as shown in Fig. 1. This cavity 90 receives the worm drive 79 of the driving arrangement 75. The rear opening in the cavity 90 above the drive 75 is preferably closed by a back cover plate 91. A front opening 92 and a front cover plate 93 therefor are also provided, this latter opening, however, being in the form of an aperture in the web portion of the channel-shaped base 87.

Referring now to Figs. 4 through 7, in addition to Fig. 1, it will be seen that the upper end of the base 87 has a vertical cylindrical bore 96. A topmost portion 97 of the base 87 is split as at 98 and a portion thereof undercut as at 99 (Figs. 4 and 6), the portion 97 being adapted to be drawn together by screws 100 to produce a clamping action.

Below the undercut 99, the bore 96 is circumferentially continuous and runs out at an internal depending boss portion 102 provided with a horizontal face 103. Below the boss portion 102, there is provided a horizontal web 104 containing a vertical bore 105 coaxial with and equal in size to the bore 96. The web 104 has an upstanding boss portion 106 provided with a horizontal annular face 107 similar to the face 103 and in predetermined spaced relation thereto. There is thus formed an internal chamber 110, the general shape of which is clear from Figs. 4, 5, and 7. A rear opening 111 in the chamber 110 is preferably closed by a cover plate 112.

A hollow screw member 115 having a smooth cylindrical external surface, the lower end of which is provided with threads 116, is slidably received in the bore 96 of the base 87 and normally extends down through the bore 105 also. An elongated key 117 is disposed in complementary keyways in the upper portion of the base 87 and in the screw member 115 to prevent rotation of the latter in the base, but not longitudinal vertical movement therein. The key 117 is secured to the upper portion of the base 87 by a drive pin 118.

The screw member 115 is supported in the base 87 by a worm gear nut 120 disposed between the opposed faces 103 and 107 in the chamber 110 of the base 87. This worm gear nut 120 is internally threaded so as to engage the threaded portion 116 of the screw member 115, and it is obvious from an inspection of Figs. 4 and 5 that horizontal rotation of the worm gear nut 120 will effect vertical movement of the screw member 115.

For rotating the worm gear nut 120, the same is provided with peripheral worm gear teeth 121 which are engaged by a worm 122, also disposed in the chamber 110. The worm 122 is appropriately keyed to a worm shaft 123, shown in Fig. 7 as extending completely through the upper portion of the base 87 and provided with removable bearings 124. The bearings 124 are mounted in the base 87 in opposed arrangement, as clearly shown in Fig. 7, and are secured therein by means of screws 125. Appropriate thrust washers 126 are disposed between each of the bearings 124 and a respective end of the worm 122. The worm shaft 123 is threaded at each of its ends to receive a nut 127 spaced from the base 87 by washers 128. Upon assembly of the worm 122 in the base 87, the nuts 126 are preferably secured by means of pins 129 to prevent their rotation on the worm shaft 123. It is thus obvious that the application of an appropriate wrench or crank to either of the nuts 126 will enable the adjustment of the screw member 115 to a desired vertical position relative to the base 87.

Figures 4, 5, 6, 7, 19, 20, 45, 46, 47, 51:
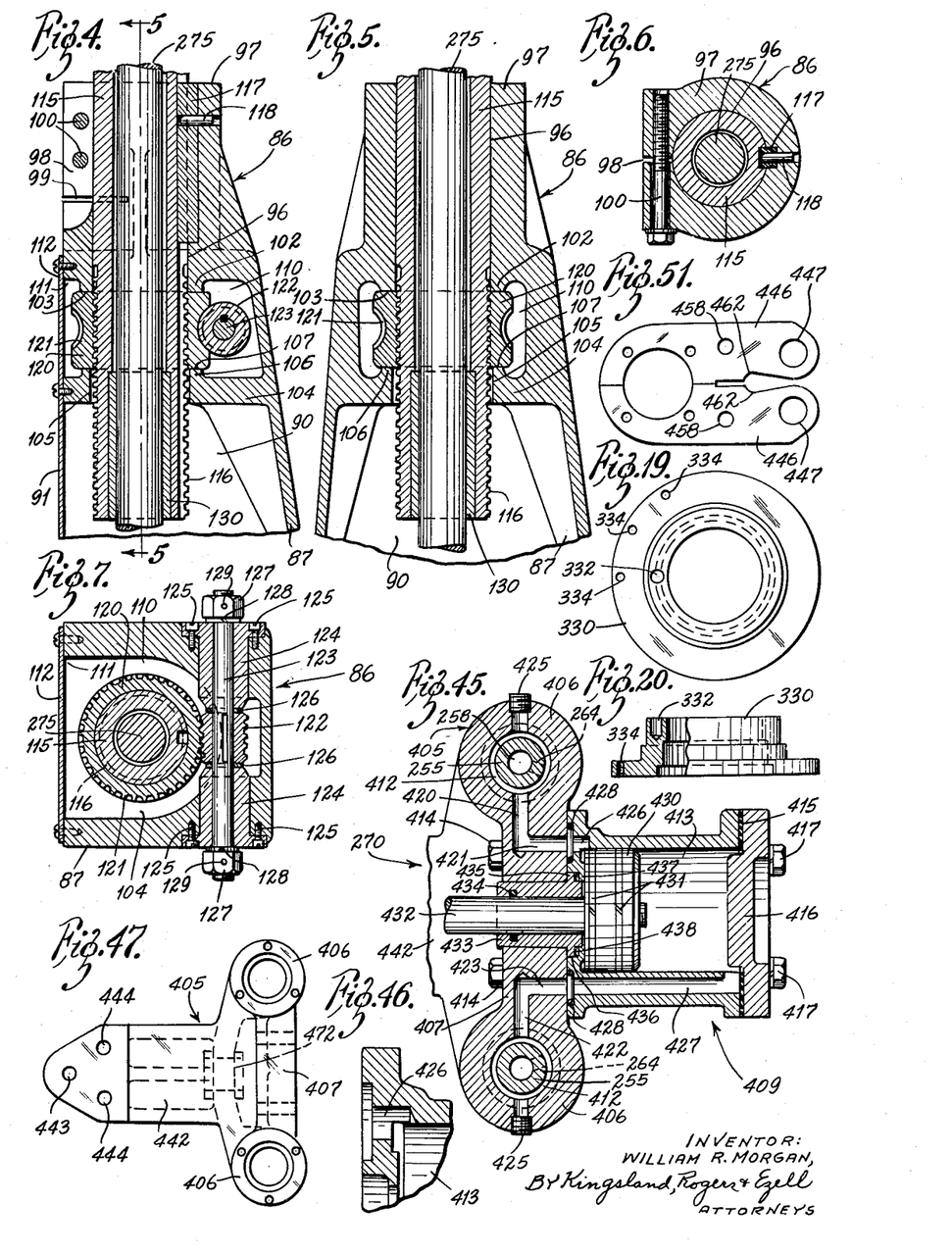
Fig. 4 is an enlarged fragmentary sectional elevation showing an adjustable support assembly forming a part of the mechanism of the present invention.
Fig. 5 is a fragmentary sectional elevation taken generally along the line 5—5 of Fig. 4.
Figs. 6 and 7 are enlarged sectional plan views of the support assembly of Fig. 5 taken generally along the lines 6—6 and 7—7, respectively, of Fig. 1.
Fig. 19 is a top plan view of a removed support for a "closing" cam.
Fig. 20 is a side elevational view, partly in section, of the cam support of Fig. 19.
Fig. 45 is a sectional plan view taken generally along the line 45—45 of Fig. 43, showing additional details of the take-out head.
Fig. 46 is an enlarged fragmentary sectional view of a portion of the take-out cylinder showing a particular air passage arrangement.
Fig. 47 is a top plan view of a removed take-out slide.
Fig. 51 is a top plan view of a pair of take-out jaws.

As aforementioned, the screw member 115 is hollow and it will be noted from Figs. 4 and 5 that the lower end of the member 115 is provided with a sleeve bushing 130 which is press-fitted into the member 115 for a purpose to appear.

Figures 8, 11, 12, 13, 14, 15, 33, 34, 35:
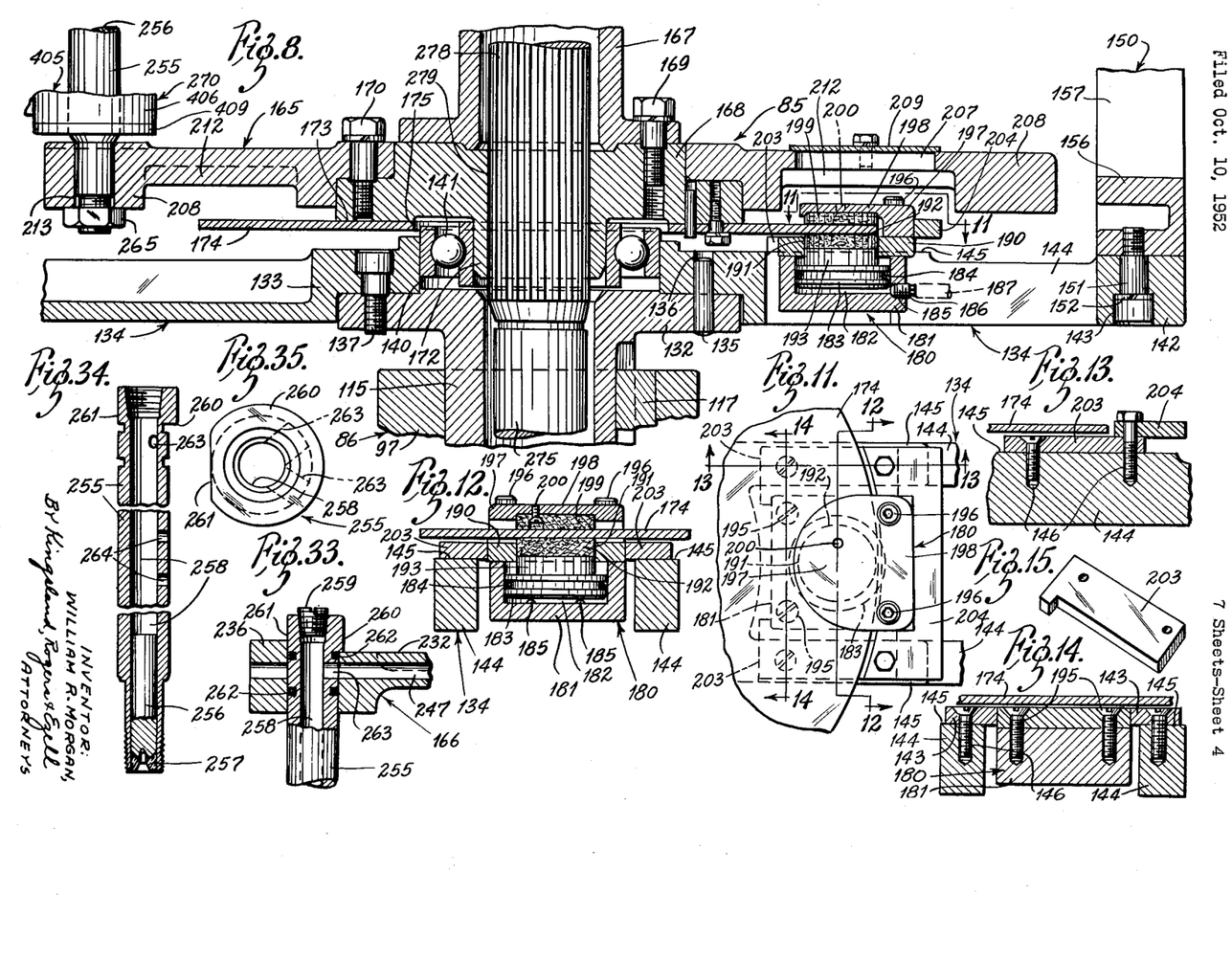
Figs. 8, 9 and 10 are further enlarged fragmentary sectional elevations showing the mounting and driving connections for a rotatable take-out carriage supported by the support assembly of Figs. 6 and 7.
Fig. 11 is a fragmentary plan view showing a hydraulic brake incorporated in the take-out mechanism, the view being taken generally from the line 11—11 of Fig. 8.
Figs. 12, 13 and 14 are sectional elevations through the hydraulic brake taken generally along the lines 12—12, 13—13 and 14—14, respectively, of Fig. 11.
Fig. 15 is an isometric view of a removed side support for the hydraulic brake.
Fig. 33 is a fragmentary sectional elevation showing a typical interfit between the disc of Fig. 29 and a hollow slide rod forming part of the take-out carriage.
Fig. 34 is a fragmentary sectional elevation of a removed slide rod.
Fig. 35 is an enlarged top plan view of the slide rod of Fig. 34.

The extreme upper end of the screw member 115 is horizontally flanged as best shown at 132 in Fig. 8. This flange 132 interfits with a recessed hub portion 133 of a circular cam table 134. The table 134 is shown removed in Figs. 16 and 17. A dowel pin 135 press-fitted into the flange 132 cooperates with a hole 136 in the table 134 for accurate location of the parts which are then secured together by means of screws 137.

As is clear from Figs. 8, 16 and 17, the hub portion 133 of the cam table 134 has a central bore 140 which receives the outer race of a ball bearing assembly 141. The table includes a relatively heavy rim portion 142 having spaced countersunk holes 143, which is joined to the hub portion 133 by appropriate ribs and webs as clearly shown in the drawings. The rib structure, as best shown in Fig. 16, is seen to comprise opposed pairs of ribs 144 each of which has smoothly finished pad surfaces 145 provided with holes 146 for a purpose to appear. It will be particularly noted that the space between the paired ribs 144 is not webbed.

Figures 40, 41, 42, 43, 44, 48, 49, 50:
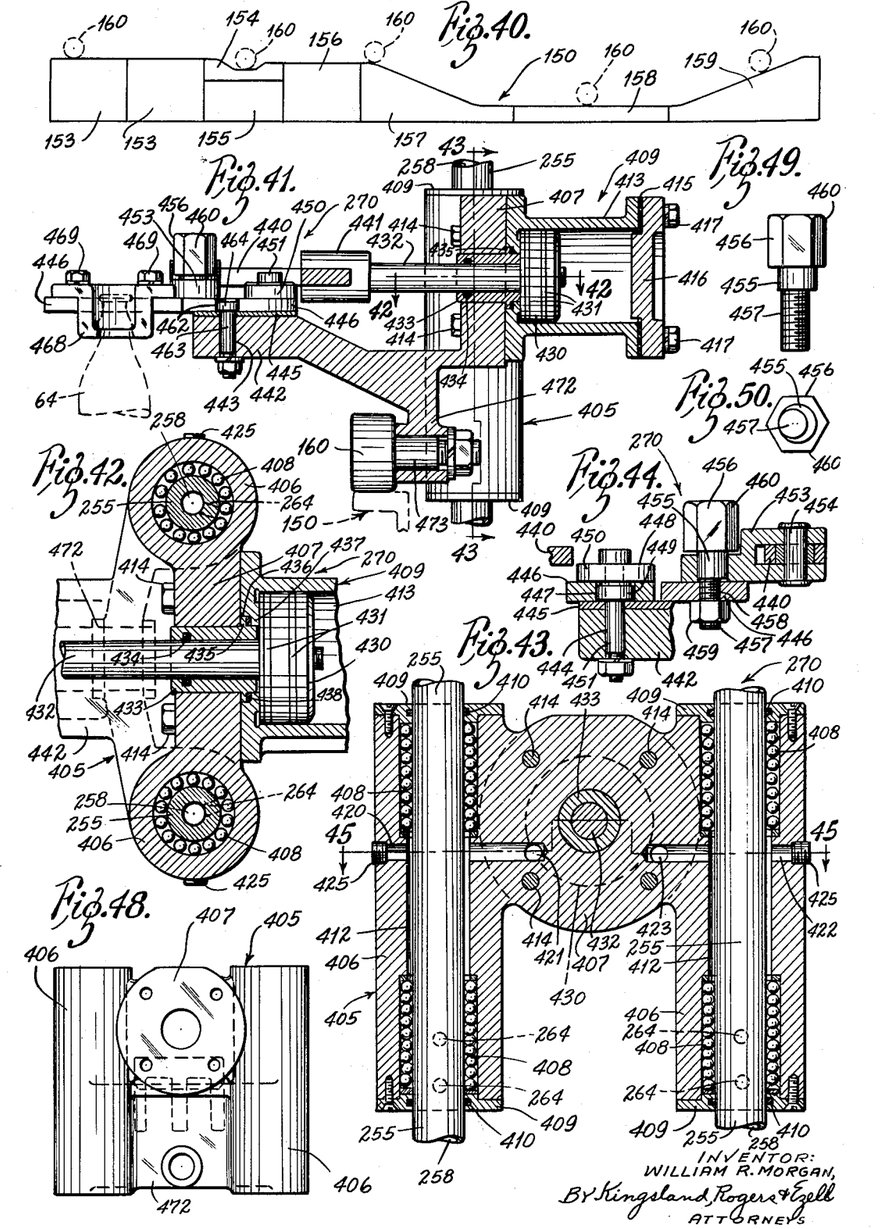
Fig. 40 is a side elevational view of a developed cam track for raising and lowering the take-out heads.
Fig. 41 is a sectional elevation of the take-out head.
Fig. 42 is a sectional plan view taken generally along the line 42—42 of Fig. 41.
Fig. 43 is a sectional elevational view taken generally along the line 43—43 of Fig. 41, showing the mounting arrangement of the take-out head, parts in the background being omitted for the sake of clarity.
Fig. 44 is a sectional elevational view taken generally along the line 44—44 of Fig. 3, showing details of the take-out jaw mounting.
Fig. 48 is a rear elevational view of the take-out slide.
Fig. 49 is a side elevational view of a removed eccentric stud for adjusting the take-out jaws.
Fig. 50 is a bottom plan view of the eccentric stud of Fig. 49.

A circular cam track assembly 150, of which a developed example is shown in Fig. 40, is disposed on the upper surface of the rim portion 142. As is clear from Fig. 3, the assembly 150 comprises a plurality of arcuate elements in end-to-end abutment to form a circular track. Each of the arcuate elements is secured to the upper surface of the rim 142 by screws 151 and lock washers 152 as shown in Fig. 8. The developed elevation of the assembly 150 shown in Fig. 40 demonstrates one pattern into which the various cam elements may be assembled. In this illustration, beginning at the left, there are two high dwell cams 153, a pick-up cam 154 mounted on a pick-up cam support 155, a dwell cam 156, a drop cam 157, a low dwell cam 158, and a rise cam 159. It will be understood that, in the above example, each of the elements is constructed to an arcuate dimension of either thirty-six degrees or a multiple thereof. Thus, each of the elements 153, 154, and 156 extends over an arc of thirty-six degrees, while each of the elements 157, 158, and 159 extends over an arc of seventy-two degrees, thereby providing a full track circle of three hundred sixty degrees. Obviously, the pattern of elevation may be varied to suit the circumstances of a particular installation by either substituting or rearranging the various cam elements. It is, of course, desirable to maintain a continuous upper cam surface for passage of an appropriate cam roller, such as 160.

The rotating carriage 85 comprises a cage-like framework which includes a lower table or disc 165 and an upper table or disc 166, these being joined and held in vertical spaced relation by a center spacer 167. Preferably, the lower disc 165 is provided with a removable hub portion, such as the drive flange 168, shown removed in Fig. 24. The lower flanged end of the spacer 167 is secured by bolts 169 to the flange 168 which is, in turn, secured by bolts 170 to the disc 165.

As clearly depicted in Fig. 8, the drive flange 168 is interfitted with both the lower disc 165 and the spacer 167 by means of rabbeted joints to provide an accurate concentric alignment of these parts. It will further be seen that the flange 168 has a depending hub portion 172 which fits the inner race of the ball bearing assembly 141, thus providing for relative rotation between the rotating carriage 85 and the cam table 134 of the support assembly 87.

Fig. 8 also shows the flange 168 to have a lower annular surface 173 to which is secured a brake disc 174. The disc 174 is a circular plate-like member having a central opening 175 for clearance of the bearing assembly 141, and is preferably both pinned and bolted to the drive flange 168.

A hydraulic brake assembly 180 is supported by the brake disc 174 so as to depend down through one of the openings between a pair of ribs 144 in the cam table 134. The brake assembly 180 comprises a rectangular cup-like housing 181 having a cylindrical cavity 182 in which is slidably received a piston 183 appropriately grooved to receive an O-ring 184. A pair of threaded holes 185 are provided in one side wall of the housing 181 adjacent the lower end of the cavity 182. One of these openings may be closed by means of a removable pipe plug 186, the other being adapted to receive a fluid supply line 187. Surmounting the housing 181, there is a piston stop plate 190 having a central circular opening 191 in which is slidably received a disc-like lower brake lining 192. As is apparent from the drawings, the circular opening 191 is of such size as also to freely receive an upstanding flat-faced boss portion 193 of the piston 183. Thus, the lower brake lining 192 is seen to be interposed between the piston 183 and the lower surface of the brake disc 174.

The piston stop plate 190 is secured to the upper face of the housing 181 by means of two countersunk screws 195 and also by two socket-head screws 196, the latter serving also to mount an upper brake shoe 197 adjacent one edge of the stop plate 190. The upper brake shoe 197 has an overhanging portion 198 provided with a circular recess which receives a disc-like upper brake lining 199 secured therein by an offset screw 200. The upper brake lining 199 rests on the top surface of the brake disc 174 in axial alignment with the lower brake lining 192. It is clear that upward movement of the piston 183 in the housing 181 will effect a frictional drag upon the brake disc 174.

As above mentioned, the brake assembly 180 is supported by the rotating brake disc 174 and is disposed in an opening between one pair of ribs 144 in the cam table 134. It is retained against horizontal movement in this opening by two side supports 203 and a rear support 204. The side supports 203, one of which is shown removed in Fig. 15, are disposed one on each side of the brake assembly 180 with the rear support 204 bridged between them. They are mounted on the surfaces 145 of the ribs 144 so as to embrace the brake assembly 180 in the manner clearly shown in Figs. 11 through 14 of the drawings.

Figures 21, 22, 23, 24, 25, 26, 27, 28, 29, 30:
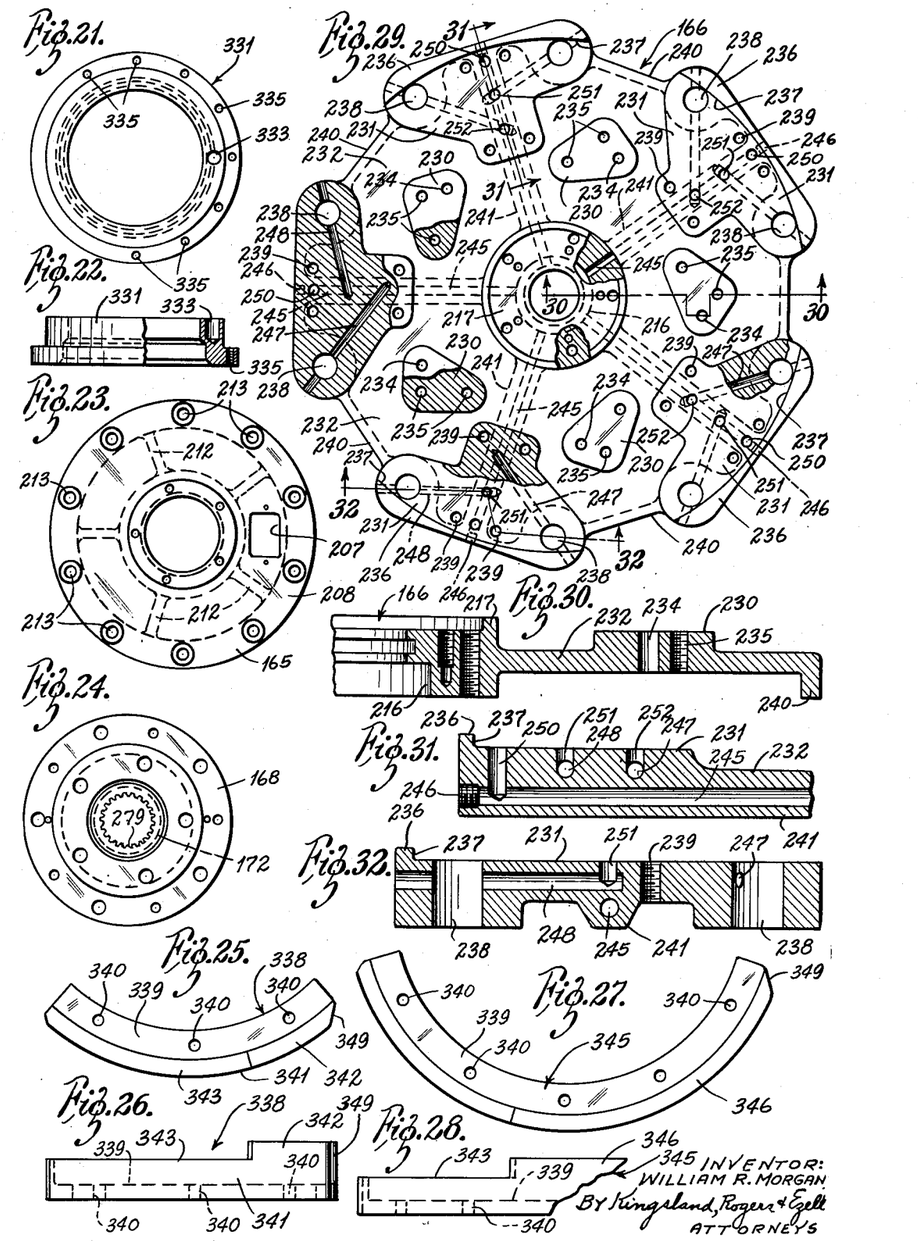

The lower disc 165, shown removed in Fig. 23, has a rectangular aperture 207 which facilitates installation and removal of the brake assembly 180. Except for this aperture, the disc 165 is completely webbed from its central hub portion outwardly to a rim portion 208. The aperture 207 is preferably closed by a removable brake cover plate 209.

In addition to its webbed structure, the disc 165 may be provided with ribs 212 for rigid support of its relatively heavy rim 208. This rim 208 is provided with an even number of holes 213 which are preferably evenly spaced apart, but which may be provided in equally spaced pairs.

Figures 9, 10, 18:
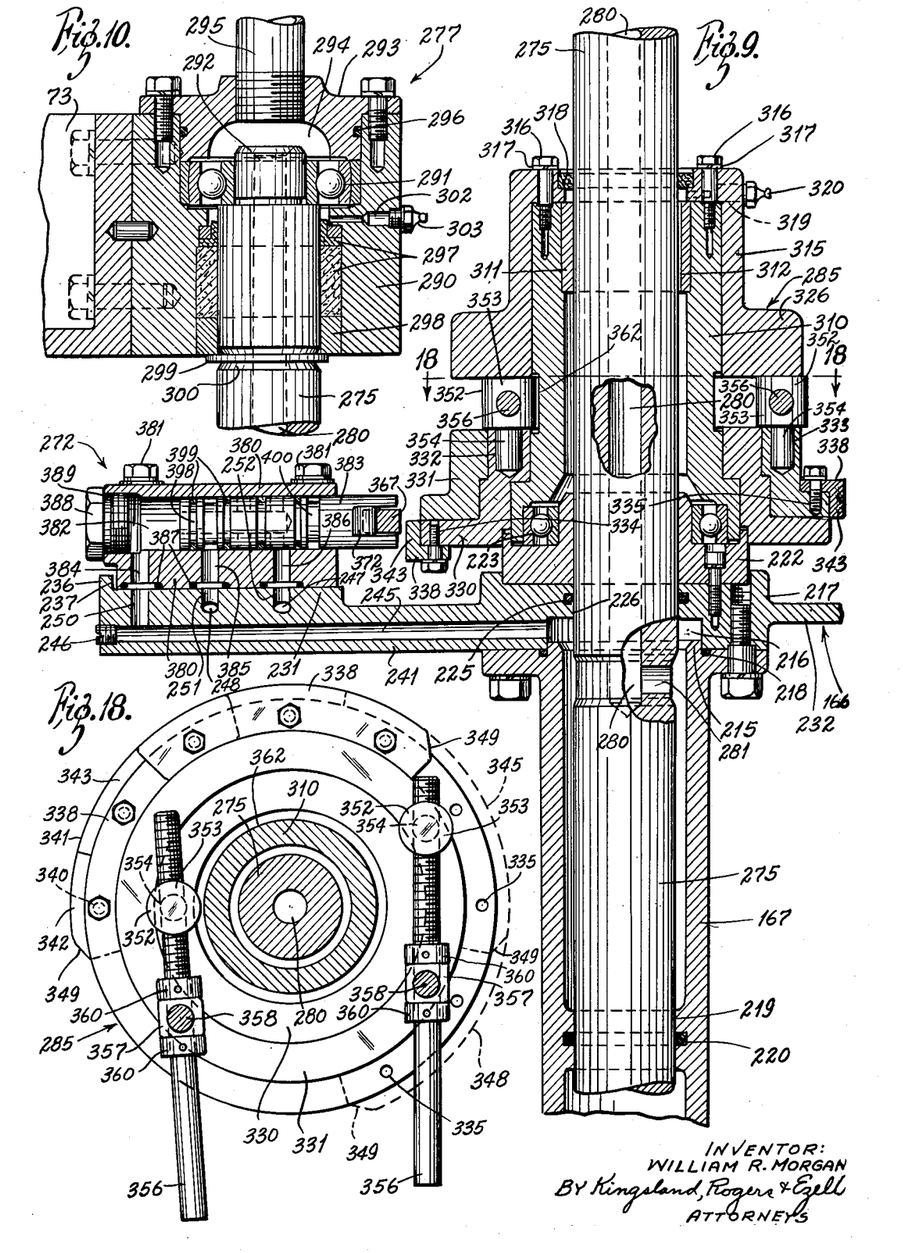
Fig. 18 is a sectional plan view taken generally along the line 18—18 of Fig. 9, parts in the background being omitted for greater clarity of detail.

The upper disc 166 of the carriage 85 is preferably joined directly to the spacer 167 as shown in Fig. 9. From this figure, it will be noted that the upper end of the spacer 167 is provided with an annular extension 215 which extends only part way into a circular recess 216 in a hub portion 217 of the upper disc 166. The unfilled portion of the recess 216 therefore forms an annular chamber which is sealed against leakage by an O-ring 218 disposed in an annular groove between the extension 215 and the upper flange of the spacer 167. The chamber thus formed communicates with the hollow interior of the spacer 167 down to a restricted area of the latter, which restricted area is formed with a bore 219 grooved to receive an O-ring 220.

The upper end of the hub portion 217 is appropriately recessed for alignment of a bearing support 222 formed as clearly shown in Fig. 9 and supporting a bearing assembly 223. It is apparent that the bearing support 222, appropriately secured to the hub portion 217 which is, in turn, secured to the spacer 167, is adapted to rotate with the carriage assembly 85 so that the bearing assembly 223 cooperates with the bearing assembly 141 in providing a rotational mounting for the carriage assembly 85.

As previously pointed out, the chamber formed by the unfilled portion of the recess 216 communicates with the interior of the spacer 167 in which latter element O-rings 218 and 220 are provided for sealing the chamber against leakage. An O-ring 225 is additionally provided to prevent leakage from this chamber through a bore 226 formed in the hub portion 217 of the upper disc 166.

Now considering Fig. 29, which shows a removed upper disc 166, along with Fig. 9, it will be observed that this disc 166 takes the form of a fairly complicated casting extensively interlaced with connecting passages.

The instant upper disc 166 comprises five operating stations, for each of which there is a cam lever mounting pad 230 and a valve mounting pad 231. These two sets of pads are arranged in respective equal angular spaced relation about the central hub 217 and are provided with planar upper surfaces which are elevated above radially extending web portions 232 which join them to the hub portion 217. The cam lever mounting pads 230, shown in sectional elevation in Fig. 30, are generally triangular in plan, and each has a smooth hole 234 and two threaded holes 235 therethrough. The valve mounting pads 231 are disposed at the periphery of the disc 166 and are of irregular T-shape in plan. Each has a raised outer rim portion 236 with an arcuate inner edge 237. Radially inwardly of the arcuate edge 237, each of the pads 231 has two relatively large vertical holes 238 therethrough, these holes being located at the ends of the cross-bar of the T. Additionally, each pad 231 has four rectangularly spaced threaded holes 239 therethrough. The several pads 231 are interconnected by depending flange portions 240 at the peripheral edges of the web portions 232. The lower surfaces of the pads 231 adjacent the holes 238 are flush with the lower edge of the flanges 240, so that the area about the holes 238 is of relatively thick section, this thickened section being extended along the peripheral edge of each pad 239 to meet at the radial centerline of the pad 231. There they are joined by a radial rib 241 of equal depth which similarly depends from the web portion of the disc 166 and extends radially from the periphery thereof inwardly to the hub section 217.

Identical groups of passages are provided for each station of the disc 166. Thus, for each station there is a passage 245 extending from the peripheral edge of the pad 231 through its associated rib 241 to communicate with the chamber 216. The outer end of this passage 245 is threaded to receive a plug 246. In each pad 231, there are formed additional passages 247 and 248, each of which extend diametrically through a respective hole 238 in the particular pad 231. As is apparent from Figs. 29 and 31, these passages 247 and 248 are located in a plane which lies above the plane of the passage 245 and, therefore, do not intersect with the latter. They do, however, have their respective inner ends located above and slightly beyond the associated passages 245, and it will be noted that the passage 247 passes over the passage 245 at a point radially inwardly from the corresponding cross-over point of the passage 248. Three holes are drilled down from the upper surface of each pad 231 so as to intersect a respective passage 245, 248, and 247. Thus, a vertical hole 250 intersects the passage 245, a hole 251 intersects the passage 248, and a hole 252 intersects the passage 247, these holes being predeterminately spaced along the radial centerlines of the ribs 241.

As shown in Fig. 1, the upper disc 166 and the lower disc 165 are joined by a plurality of slide rods 255 to form a cage-like rotating structure. These rods 255, as best shown in Figs. 34 and 35, are fabricated from hollow tubes. A plug 256 is inserted in the lower end of each tube and welded therein as at 257. Thus, the internal passage 258 is closed at the bottom. At the top, the rods are threaded to receive plugs 259 as shown in Fig. 33. The upper end of each slide rod 255 has a flange 260 which is flattened, as at 261, for a purpose to appear. Immediately below the flange 260, the rods have spaced external grooves to receive O-rings 262. Intermediate these grooves, the side wall of the rod is pierced by a pair of angularly disposed passages 263, and centrally of each slide rod 255 additional passages 264 are provided through the side walls.

Each slide rod 255 is inserted down through a hole 238 in the upper disc 166 so that the flange 260 rests upon the upper surface of the pad 231 and so that the flat portion 261 of the flange is positioned against the vertical edge of the rim 236. Thus disposed, it is apparent that one of the passages 263 will be aligned with either a passage 247 or a passage 248 in the upper disc 166. The remaining hole 263 will, of course, be rendered ineffective, from which it will be seen that the slide rods 255 are interchangeable between the several holes 238.

The lower end of each slide rod 255 is reduced in diameter to fit the hole 213 in the lower disc 165. This lower end is also threaded to receive a nut 265 by means of which the slide rod is anchored firmly in place.

It will be noted then, that for each station on the upper disc 166 represented by a pad 231, there are a pair of slide rods 255, the hollow interior of one of these rods being communicated with a passage 247 and that of the other communicating with a passage 248. Each pair of slide rods 255 mounts one take-out head assembly 270 to be described hereinafter.

For each take-out head assembly 270, there is provided a control valve assembly 272 and an associated cam lever assembly 274, each of the former being mounted on one of the pads 231 and each of the latter being mounted on one of the pads 230. These control assemblies are described below.

The rotating carriage 85 is driven in its rotary motion by a drive shaft 275 which is attached to the take-off shaft 80 of the driving arrangement 75 by a combination coupling and whip reducing device 276. This device 276 may consist of a pair of half-round collar elements bolted together around the ends of the two shaft members and frictionally bound to them.

The drive shaft 275 extends vertically upwardly from its attachment to the take-off shaft 80 to a stuffing box assembly 277 at the top of the mechanism 69. The assembly 277 is appropriately secured to one end of the laterally extending cross-arm member 73. The drive shaft 275 thus extends upwardly within the base 87 and passes through the screw member 115, receiving lateral bearing support in its passage through the sleeve bushing 130 at the lower end of the screw member 115. Beginning at approximately the upper end of the screw 115, the drive shaft 275 is splined as at 278. These splines mesh with complementary splines 279 in the drive flange 168, and it is therefore apparent that rotation of the shaft 275 will effect rotation of the whole carriage assembly 85 through this drive flange 168.

Above the flange 168, the drive shaft 275 continues upwardly through the spacer 167 making sealing engagement with the O-ring 220 disposed in the grooved bore 219. The splines 278 extend only to a point somewhat below this bore 219, and it may be mentioned here that the splined fit of the shaft 275 with the drive flange 168 is such as to enable free vertical adjustment of the carriage assembly 85 relative to the drive shaft 275.

From its lower end up to a point slightly below the upper end of the spacer 167, the drive shaft 275 is preferably solid. From this point upward, however, it contains a passage 280 which extends to the upper end of the shaft 275.

Opposite the blind lower ends of the passage 280, the shaft 275 has a short section of reduced diameter. A radial passage 281 communicates the lower end of the passage 280 with the hollow interior near the upper end of the spacer 167. From this point, the shaft 275 extends upwardly through the hub portion 217 of the upper disc 166 and continues through the bearing support 222, these parts, of course, rotating with the shaft 275.

Above the carriage assembly 85, the drive shaft 275 extends rotatably through an adjustable valve cam assembly 285 to be described, and, thereabove, to the stuffing box assembly 277.

The stuffing box assembly 277 comprises a box member 290 appropriately indexed and secured to the end of the cross member 73. The upper end of the box member 290 is cylindrically recessed to receive a self-aligning ball bearing assembly 291, which, in turn, receives within its inner race a reduced upper end 292 of the drive shaft 275. A removable cap 293 closes the upper end of the box 290 and also retains the bearing assembly 291. The cap 293 is recessed as at 294 and is provided with a threaded aperture which receives an air pipe 295. This construction, shown in Fig. 10, clearly communicates the pipe 295 with the passage 280 in the drive shaft 275, and, hence, with the several passages in the carriage assembly 85 previously described. Leakage past the cap 293 is prevented by an O-ring 296 disposed in a peripheral groove formed in the cap 293. Below the bearing assembly 291, the box 290 is provided with appropriate well-known seals 297 retained by an annular seal stop 298, the latter being, in turn, retained within the assembly 277 by a snap-ring 299 disposed in a groove 300 in the shaft 275 adjacent the lower surface of the box member 290.

A hole 302 threaded to receive a lubrication fitting 303 is provided in one side wall of the box member 290 for lubrication of the seal rings 297.

Fig. 2 shows the box member 290 to have a projecting lug 305 extending transversely thereto. A similar lug 305 projects from the other side of the box member 290 parallel with the above-mentioned lug 305 so that the two lugs embrace a vertically movable steadying bar 306 for a purpose to be described.

The valve cam assembly 285 is located immediately above the rotating carriage assembly 85 and, while supported by the assembly 85, is not rotatable therewith as will be seen.

This valve cam assembly 285 includes a sleeve-like bearing housing 310 which fits with substantial clearance about the vertical drive shaft 275. At its upper end, it is provided with a pressed-in sleeve bearing 311 containing a longitudinal grease groove 312. The drive shaft 275 rotates in this bearing.

At its lower end, the bearing housing 310 is recessed to receive the bearing assembly 223 which provides for relative rotation between the rotating assembly 85 and the non-rotating assembly 285.

A steadying cap 315 fits down over the upper end of the housing 310 and is secured thereto by screws 316 and lock washers 317. The upper opening of the steadying cap 315 through which the shaft 275 passes is provided with an appropriate recess to receive a sealing ring 318. Immediately below this sealing ring 318, a hole 319 threaded to receive a lubrication fitting 320 is provided for lubricating the sleeve bearing 311.

One side of the steadying cap 315 is finished with a planar vertical face 322 to which the steadying bar 306 is secured by suitable locating pins 323 and bolts 324, as shown in Fig. 2. This interconnection of the valve cam assembly 285 and the stuffing box assembly 277 clearly permits vertical movement of the former while precluding rotary movement thereof.

The lower end of the cap 315 has a relatively thick flange therearound except for the planar surface 322. This flange 326 has two vertical holes 327 drilled up from the lower surface thereof which are equi-distantly spaced from the vertical centerline of the cap 315. One of these holes 327 is shown in Fig. 2.

As is apparent from Fig. 9, the lower end of the bearing housing 310 is externally stepped so as rotatably to receive a "closing" cam support 330. This support 330 is shown removed in Figs. 19 and 20, which, along with Fig. 9, show it to be also externally stepped so as rotatably to receive an "opening" cam support 331. The support 331 is shown removed in Figs. 21 and 22. It will be seen that each of the supports 330 and 331 has a hole drilled down from its upper surface, the one in the support 330 being designated 332 and the one in the support 331 being designated 333. Additionally, each of the supports 330 and 331 has a radial flange at its lower end, each flange containing a plurality of vertical holes therethrough. In the illustrated mechanism, the support 330 has three holes 334 spaced thirty degrees apart, whereas the support 331 contains eight holes 335 also spaced thirty degrees apart. These respective hole patterns are predeterminately located relative to the associated holes 332 and 333.

In Figs. 25 and 26, there are shown, respectively an upper plan view and a side elevational view of a valve cam 338. As may be seen, the cam 338 is arcuate in plan and includes an inwardly extending flange portion 339 which contains three holes 340 adapted to align with the three holes 334 in the closing cam support 330. The outer portion of the cam 338 comprises an upstanding peripheral wall 341, a portion 342 of which extends to a higher elevation than a co-extensive portion 343. As illustrated in Fig. 9, this cam 338 is secured to the outer and underneath surfaces of the flanged support 330 by appropriate screws and lock washers. Thus mounted, it will be noted that the portion 343 extends substantially to the upper surface of the flange on the support 330, and, in view of the contiguous relation between the supports 330 and 331, it is further apparent that the portion 342 of the cam 338 will extend up alongside the peripheral edge of the flange on the support 331.

The above-described mounting of the cam 338 on the "closing" cam support 330 identifies it as a "closing" cam. Another cam 338, however, may be employed as an "opening" cam, and for this purpose will be inverted and secured to the upper and outer surfaces of the flange of the "opening" cam support 331, as clearly shown in Fig. 9. The cam 338, when employed as an opening cam, extends from the upper surface of the flange on the support 331 substantially to the lower surface thereof, and the portion 342 will extend down alongside the peripheral edge of the support 330.

Under certain circumstances, a cam 338 will not be suitable for use as an opening cam, in which case, it may be desirable to use an alternative cam 345 as depicted in Figs. 27 and 28. It will be noted that the cam 345 is similar to the cam 338 except for the added length of the portion 346 of the former which corresponds to the portion 342 of the cam 338. The added length of the portion 346 makes desirable the extension also of the inwardly extending flange portion and additional holes therethrough.

Fig. 18 shows a plan view in which two cams 338 are used, one as an opening cam and the other as a closing cam. As here illustrated, the opening and closing cams are so mounted on their respective supports as to overlap each other, which relation is permitted by the arrangement of the portions 343. Fig. 18 also shows, in dotted outline, the alternate installation of a closing cam 345 and also an even longer closing cam 348. It will be noted that the free ends of the portions 342 and 346 of these cams are bevelled or chamfered, as at 349, so as to provide a transition surface from the outer periphery of these elements to the peripheral edges of their respective supports.

As above indicated, the cam supports 330 and 331 are individually rotatable about the vertical centerline of the mechanism 60. In this connection, each is engaged by an individual pilot member 352 (Figs. 9 and 18) having a cylindrical head 353 and a depending stem 354. One of these pilot members 352 surmounts each of the cam track supports 330 and 331, with a respective stem portion 354 rotatably inserted in each of the holes 332 and 333 and with the heads 353 occupying the space between the upper surfaces of the supports 330 and 331 and the lower flanged surface of the steadying cap 315. Each of the heads 353 has a horizontal hole extending diametrically therethrough, threaded to receive individual valve cam adjusting shafts 356. These adjusting shafts 356 are additionally mounted in pivot members 357 having a configuration generally similar to that of the pilot members 352, except that the head portions are preferably rectangular instead of cylindrical and the transverse holes are not threaded.

The pivot members 357 have their stem portions 358 upstanding rather than depending, these stem portions being rotatably inserted in respective holes 327 in the cap 315. The rectangular heads of the pivot members 357 also occupy the space between the cap 315 and the support members 330 and 331.

As best shown in Figs. 2 and 18, the adjusting shafts 356 extend rotatably through the pivot members 357, but are restrained from longitudinal movement therein by collars 360 disposed adjacent the members 357 and appropriately pinned to the shaft 356.

The illustrated longitudinal extension of the adjusting shafts 356 beyond the cam assembly 285 enables these shafts to be manually rotated, and it is obvious that their pivoted securement in the non-rotatable cap 315 translates this movement of the adjusting shafts into selective rotary adjustment of the cam supports 330 and 331.

The bearing support housing 310 is preferably relieved, as at 362, to provide appropriate clearance for the head 353 of the most inwardly disposed pilot member 352, as well as for the threaded portions of the shafts 356.

It has been previously mentioned that the instant mechanism 60 has five take-out head assemblies 270 and that there are correspondingly five stations on the upper carriage disc 166, each of these stations including a cam lever mounting pad 230 for a cam lever assembly 274 and a valve mounting pad 231 for a control valve assembly 272. It is apparent from Fig. 3, then, that the opening and closing cams above described are adapted to cooperate with the cam lever assemblies 274 to effect periodic operation of the valve assemblies 272 during rotation of the carriage assembly 85.

Each of the cam lever assemblies 274, one of which is shown removed in Fig. 37, comprises a hinge bracket 365 shaped as clearly indicated in Figs. 3 and 37, and secured to the upper surface of the pads 230 by means of bolts 366 engaging the threaded holes 235. The bracket 365 is bifurcated to receive a laterally extending lever 367. This lever 367 is shown removed in Fig. 38 and is seen to be roughly triangular in plan and to have a pivot hole 368 in one corner of the triangle. Adjacent the side of the triangle which is opposite the hole 368, the lever, itself, is bifurcated and provided with a rotatable cam follower 369. The upper end of the lever 367, as shown in Fig. 38, is shaped to extend generally away from the cam follower 369 and is provided with a press-fitted roller 372, the latter having a portion of its periphery exposed as illustrated.

The lever 367 is pivotally mounted in the bracket 365 by a pin 373 which extends down into the hole 234 in the pad 230. An adjustable stop is provided to limit the pivotal movement of the lever 367 in one direction. In the instant illustration, this stop takes the form of a stud 375 extending transversely through the bight portion of the bracket 365 for abutment with the cam lever 367 as shown in Figs. 3 and 37. The stud 375 may be secured in an appropriate adjusted position by a jam nut 376.

The pivotal movement of the cam lever 367 is controlled by the above-mentioned opening and closing cams. As is apparent from Fig. 9, the lever 367 is disposed at an elevation which permits its cam follower 369 to be engaged by either or both of the opening and closing cams. Thus disposed, the cam lever 367 is, in turn, adapted to control the operation of the valve assembly 272, as will appear.

Each valve assembly 272 includes a valve body 380 which is mounted on the upper surface of one of the pads 231 by means of bolts 381 extending vertically through the body 380 to engage the holes 239 in the pad 231. As best shown in Fig. 9, the body 380 has a main longitudinal bore 382 which slidably receives a valve piston 383. Additionally, the body 380 has three vertical passages 384, 385, and 386, which respectively communicate the bore 382 with the passages 250, 251, and 252 in the valve mounting pad 231 of the upper disc 166. Each of the passages 384, 385, and 386 is laterally enlarged at its lower end to provide a seat for an O-ring 387, thereby to preclude leakage between the body 380 and the pads 231. The outer end of the bore 382 is appropriately closed by a cap or plug 388 provided with an O-ring 389.

Fig. 3 shows the body 380 to have laterally extending bosses 390 and 391 on opposite sides of the body 380 and offset one from the other. Each of these bosses is drilled through to communicate with the bore 382 as shown in Fig. 36, and each receives a threaded pipe bushing 392 for connection of individual valves 393. These valves 393 are preferably of the globe needle type, but may otherwise be of any well known design. It will be understood that the passage in the boss 390 is in vertical alignment with the passage 385 in the body 380 and that the passage through the boss 391 is in similar alignment with the passage 386.

The piston 383 is generally cylindrical in shape and, as best shown in Fig. 39, has spaced diametrically drilled passages 395 and 396, each of which communicates with a longitudinal passage 397. Additionally, the piston 383 has six external annular grooves, four of which, designated 398, receive piston rings 399. The remaining two grooves, designated 400, are preferably somewhat wider than the grooves 398, approaching the diametrical dimension of the passages 385 and 386. Fig. 39 illustrates an appropriate relative spacing of the several grooves 398 and 400, and Fig. 9 shows the arrangement of these grooves relative to the valve body 380. It will be noted from the latter figure that, with the valve piston 383 in the position shown, the diametrical passage 396 communicates the longitudinal passage 397 with the passage 386 in the body 380. At the same time, the left-hand groove 400 communicates the passage 385 with the passage in the boss 390 and, hence, with one of the needle valves 393. If the valve piston 383 shown in Fig. 9 should be moved toward the left until the diametrical passage 395 communicates with the passage 385 in the body 380, it is obvious that the passage 386 will then be communicated by way of the right-hand groove 400 to the passage in the boss 391 and to the other needle valve 393. The placement of the piston rings 399 clearly prevents leakage between the left-hand end of the piston 383, the annular grooves 400, and the drilled passages 395 and 396.

The right-hand end of the valve piston 383 is adapted to extend inwardly beyond the valve body 380 and is bifurcated in a direction at right angles to the direction of the passages 395 and 396. This bifurcated end of the piston 383 receives the free end of the cam lever 367 with the cam roller 372 abutting the bight portion of the bifurcated end. It will be noted that this engagement of the cam lever 367 with the piston 383 prevents rotation of the latter in the bore 382 and thus maintains the diametrical passages 395 and 396 in constant vertical position for appropriate alignment with the passages 385 and 386 in the body 380. Although the diametrical passages 395 and 396 would not necessarily have to extend completely through the piston 383, it is obvious that their extension, as described, precludes the possibility of assembling the piston 383 in a non-operative position.

Each of the valve assemblies 272 is clearly adapted to control the flow of an appropriate operating fluid to a pair of slide rods 255 due to the aforementioned interconnection of these slide rods 255 with the upper disc 166. For example, a fluid, such as compressed air, may be introduced into the mechanism 60 by way of the supply pipe 295 located in the stuffing box cap 293. The compressed air may then pass downwardly through the passage 280 in the drive shaft 275, emerging from the latter at the cross passage 281 and passing thence into the upper end of the hollow spacer 167, through the chamber 216 and the passage 245 in the upper disc 166, and through the connecting passage 250 into the valve assembly 272. The compressed air may then be selectively diverted by appropriate positioning of the valve piston 383 into either a passage 247 or a passage 248 in the upper disc 166 and, hence, to the interior of either of the slide rods 255 connected with these passages 247 and 248.

As previously noted, the slide rods 255 are arranged in pairs, and, further, each pair of slide rods 255 supports a take-out head assembly 270. The ten slide rods 255 in the instant mechanism 60 thus support five take-out head assemblies 270, one for each of the aforementioned operating stations.

Referring now particularly to Figs. 41 through 51 of the drawings, each take-out head assembly 270 includes a slide bracket 405 shaped as clearly shown in the external views of Figs. 47 and 48 and the sectional views of Figs. 41, 42, 43, and 45. From these views, it will be seen that the bracket 405 includes two parallel sleeve-like sections 406 interconnected by a bulkhead section 407. Each of the sleeve-like sections 406 is provided with a pair of ball bushings 408 disposed at opposite ends thereof and retained by caps 409 fitted with O-rings 410. By this construction, the slide brackets 405 are mounted on a pair of slide rods 255 so as to be freely movable thereon. From Fig. 43, it may be observed that the space between each pair of ball bushings 408 is bored to a diameter such as to provide an open cylindrical space 412 between the slide rod 255 and the wall of the sleeve-like section 406.

It may be here mentioned that the normal vertical movement of the slide brackets 405 on the slide rods 255 and the location of the cross passages 264 in the latter are so related as to always maintain an O-ring 410 both above and below the passages 264. This arrangement provides for free passage of the operating fluid from within the slide rods 255 to the space 412 without leakage from the ends of the sections 406. It will be noted that in certain positions of the bracket 405 the fluid will pass through the ball bearings 408.

The bulkhead portion 407, which bridges the two sleeve-like portions 406, supports an air motor assembly 409 in horizontal rearward extension therefrom. This motor 409 includes a cylinder 413 having its forward closed end secured to a rear vertical face of the bulkhead portion 407 by screws 414. The rear end of the cylinder 413 is closed by a gasket 415 and a head 416 secured by bolts 417. As best shown in Figs. 43 and 45, the bracket 405 is provided with internal fluid passages for individually communicating the two spaces 412 with the cylinder 413 of the air motor 409. Thus, there is a passage 420 drilled diametrically across one of the sleeve-like sections 406 and extending into the bulkhead portion 407 where it is intersected by a passage 421 drilled from the rear face of the bulkhead portion 407. Similarly, a passage 422 extends diametrically across the other sleeve-like portion 406 also into the bulkhead portion 407 where it is intersected by a passage 423 drilled from the rear face of the section 407. The outer ends of the passages 420 and 422 are closed by plugs 425.

The cylinder 413 has a fluid passage 426 which communicates the forward end of the cylinder with the passage 421, and has also a passage 427 which communicates the rear end of the cylinder with the passage 423. These passages 426 and 427 are appropriately enlarged at their outer ends to accommodate O-rings 428.

A piston 430 provided with piston rings 431 is mounted for reciprocation in the cylinder 413, and a piston rod 432 extends forwardly through the bulkhead portion 407 of the slide bracket 405. A sleeve bushing 433 provided with an O-ring 434 is inserted in the bulkhead portion 407 as a guide for the piston rod 432. This sleeve 433 has an external annular flange 435 which interfits with a recess 436 in the mounting head of the cylinder 413 to insure appropriate axial coextension of these parts. The several motors 412 are thus interchangeable between the brackets 405. The flange 435 also cooperates with an inwardly extending flange 437 on the mounting head of the cylinder 413 to accommodate an O-ring 438. The O-rings 434 and 437 are designed to prevent leakage from the forward end of the cylinder 413.

It is apparent that the arrangement of fluid passages in the take-out head assembly 270 is such that the reciprocating movement of the piston 430 and the piston rod 432 is selectively controlled by operation of the valve assembly 272.

The piston rod 432 has a yoke 440 on its forward or outer end, this yoke 440 being welded into a clevis 441 on this end of the piston rod 432 (Figs. 3 and 41). Immediately below this yoke 440, there is a forwardly extended horizontal shelf portion 442 which is part of the slide bracket 405. The shelf portion 442 has one hole 443 on its longitudinal centerline and two holes 444 offset therefrom as shown in Fig. 47. Preferably, a wear plate 445, similarly drilled, is provided for the upper surface of the horizontal shelf portion 442.

A pair of plate-like jaw carriers 446 are shaped as clearly shown in Fig. 51. Each has a pivot hole 447 by means of which it is pivotally mounted on top of the wear plate 445 (Figs. 41 and 44). This pivoted mounting of each take-out jaw carrier 446 includes a bushing 448 having a lower portion 449 which is pivotally inserted into the hole 447, and an upper portion 450 of larger diameter which overlies the jaw carrier 446. The stud 448 is drawn down firmly against the wear plate 445 by means of a bolt assembly 451, the vertical length of the portion 449 being such as to provide for free pivotal movement of the jaw carrier 446.

Each of the take-out jaws 446 is connected to a free end of the yoke 440 as shown in Figs. 3 and 44. For this purpose, the free ends of the yoke 440 are provided with appropriately bushed holes for pivotal attachment of links 453 by means of link pins 454. The end of the link 453 which is attached to the yoke 440 is preferably of clevis form, as shown in Fig. 44. The other end of the link 453 receives an eccentrically disposed portion 455 of an eccentric stud 456. A lower threaded portion 457 of the eccentric stud 456 extends through a hole 458 in the jaw carrier 446 and is secured by a nut 459. As is evident from the drawing, a head portion 460 of the stud 456 is formed to a height sufficient to enable the application of a wrench thereto without interference from the link 453. Thus mounted, it is apparent that the jaw carriers 446 are adapted to be pivoted toward and away from each other upon reciprocation of the yoke 440. It is further apparent that rotation of the eccentric stud 456 provides for appropriate adjustment of the jaw carriers 446 relative to the reciprocating yoke 440.

As best shown in Fig. 51, each of the jaw carriers 446 is relieved, as at 462, for appropriate cooperation with a stop screw 463. This stop screw 463 is secured in the hole 443 in the shelf portion 442 of the slide bracket 405 and is provided with a head 464 of appropriate diameter for engagement with the portions 462 of the take-out jaw carriers 446. Obviously, the stop screw 463 provides for a fixed closed position of the jaw carriers 446.

The outer or forward ends of the take-out jaw carriers are formed semicircularly to receive semicircular take-out jaws 468. These take-out jaws 468 may be of any configuration appropriate to the shape of the ware being taken out and are removably secured to the jaw carriers 446 by means of bolt assemblies 469. Figs. 1 and 41 each show an appropriate relationship of a take-out jaw 468 with a glass bottle 64.

As previously mentioned, the take-out head assemblies 270 are adapted to move vertically on the slide rods 255. To this end, the slide bracket 405 has a depending portion 472 which mounts a cam follower assembly 473 of well known design. The assembly 473 includes the aforementioned roller 160 adapted to engage the upper surface of the cam track assembly 150 on the cam table 134. Clearly, rotation of the carriage assembly 85 which carries the take-out head assemblies 270 causes the rollers 160 to follow the elevations of the cam track 150, with corresponding vertical displacement of the take-out head assemblies 270.

*Operation*

As previously noted, the driving arrangement 75, which interconnects the instant glassware take-out mechanism 60 with an associated glassware forming machine, effects coordinate rotation of the main drive shaft 275 and, hence, of the entire rotating assembly of the mechanism 60 with the glassware forming elements of the associated machine. The timing is such that a take-out head assembly 270 is introduced to the starting point, which is the nine o'clock position in the plan view of Fig. 3, every time a finish mold 65 is brought to a corresponding position by the forming machines. The particular forming machine illustrated here is described, as aforementioned, in the application of Samuel E. Winder, bearing Serial No. 688,470. This forming machine is described as having ten finish mold sets, and it is obvious that the instant mechanism 60, having only five take-out head assemblies 270, must, therefore, rotate at twice the angular speed of the forming machine.

Inasmuch as the operation of each take-out head assembly is identical, it will be sufficient to explain a single cycle for one of these assemblies 270. It will be understood that each of the head assemblies 270 is continuously supplied with an operating fluid, preferably compressed air, and that each successively undergoes the cycle of operation to be described.

Compressed air is continuously supplied to the mechanism 60 through the supply pipe 295 and is conducted as previously described to the valve assemblies 272 for distribution to the take-out heads 270. As each of the latter approaches the take-out position, its associated valve piston 383 will be in an outer position as distinguished from the illustration of Fig. 9 in which this valve is shown in its most inward position. In its outer position, the piston 383 is effective to direct the compressed air supply into the passage 385 in the valve body 380 and ultimately to the forward end of the pneumatic cylinder 413. At the same time, the passage 386 in the body 380 is communicated with the external boss 391, thereby porting the rear end of the cylinder 413 to atmosphere by way of the needle valve 393. Under these conditions, the piston 430 will be in a retracted position in the cylinder 413, and the jaw carriers 446 along with the take-out jaws 468 supported therein will be in "open" position as indicated at the top of Fig. 3.

It is clear from Fig. 9 that the compressed air supply continuously exerts a force against the left-hand end of the piston 383 so that this element is continuously urged toward its most inward position as depicted in that figure. It will be understood, therefore, that the positioning of the piston 383 in its above-described outer position is enforced by engagement of the cam lever 367 with one or both of the cams supported by the cam supports 330 and 331.

Inasmuch as both the take-out head 270 and the finished ware to be removed approach the take-out point simultaneously, the head must be elevated to a height sufficient to permit the leading take-out jaw to be moved over the top of the ware for subsequent engagement therewith. Thus, during its approach to the take-out point, the head 270 occupies its highest operating position, which is effected by the riding of the cam roller 160 mounted in the slide bracket 405 along the top surface of a cam segment 153. It will be noted from Fig. 40 that the cam segment 153 are the highest of those which comprise the cam track assembly 150.

As previously mentioned, the finished ware, such as the glass bottle 64, approaches the take-out point supported only at its bottom by a mold end closure 66. This leaves its upper end free to be engaged by the take-out jaws 468. As the take-out point is reached, the cam roller 160, having now rolled over onto the pick-up cam 154, drops down in the depression in the top surface thereof with the result that the take-out head assembly 270 descends to dispose the open jaws 468 on opposite sides of the finish of the ware.

During the momentary dwell of the cam roller 160 in the depression in the pick-up cam 154, the roller 369 in the cam lever 367 rolls off the chamfered end 349 of the closing cam 338, thereby enabling the valve piston 383 to move, under the influence of compressed air pressure at its outer end, to its most inward position. As is now apparent, this repositioning of the valve piston 383 causes the compressed air supply to be ported to the rear end of the cylinder 413, and, at the same time, opens the forward end to exhaust by way of the boss 390 in the valve body 380. There results a forward movement of the piston 430 which carries the yoke 440 with it and causes the two jaws 468 to close together under the force transmitted through the links 453. These jaws thus close against the ware, engaging it immediately below the finish as shown in Figs. 1 and 41.

Immediately after the ware is grasped by the take-out jaws 464, the cam roller 160 leaves the depression in the pickup cam 154 and ascends to the level of the dwell cam 156. This action lifts the head assembly 270, which, in turn, causes the ware to be lifted off the bottom plate 66 of the finish mold 65.

The ware is then conveyed at an elevation enforced by the dwell cam 156 for a desired angular distance, after which the cam roller 160 begins to descend along the inclined upper surface of the drop cam 157. The valve assembly 272 does not normally change its position during this operation, so that the ware continues to be held. After rotation through a desired distance, generally not less than ninety degrees from the take-out point, the cam roller 474 reaches the elevation of the low dwell cam 158. This is arranged to provide proper elevation for disposing the ware of an appropriate conveyer, such as a belt conveyer 475 (Figs. 1 and 3), for removal from the vicinity of the mechanism 60.

When the take-out head 270 reaches the position to discharge the ware to the conveyer 475, the cam roller 369 in the cam lever 367 will ride up the chamfered end 349 of the opening cam, thus moving the cam lever 367 and re-positioning the valve piston 383 in its outer position. Thus, the yoke 440 is again retracted to effect opening of the take-out jaws 468 and release of the ware. The conveyer is operated at a speed such that it will withdraw the ware from the take-out jaws as the latter continue to move with the rotating asembly.

Continued rotation of the head 270 with the carriage assembly 85 causes the cam roller 160 to ride up the inclined upper surface of the rise cam 159, ultimately to the level of the high dwell cams 153. The valve assembly 272 is not changed during this period inasmuch as the overlapping opening and closing cams which control the position of the cam lever 367 and, hence, of the valve piston 383 are effective to maintain the latter in its outer position. Thus, the head 270 is in appropriate condition again to approach the take-out point and to repeat its cycle.

It will be observed that, with this take-out mechanism 60, one take-out head 270 is transferring one article of ware while another take-out head is engaging a subsequent article of ware from a following finish mold 65. Each of the five take-out heads 270 in the instant mechanism 60, however, follows an identical pattern of operation, owing to the fact that each is controlled in the operation of its take-out jaws and in its vertical displacement by the same cam assembly 285 and cam track arrangement 150, respectively.

The particular arrangement of both of these cam assemblies may be widely varied to accord with any desired location of the conveyer 475 which removes the ware from the mechanism 60. One critical relationship must be observed, however, this being the proper positioning of both the pick-up cam 154 and the closing cam 338 to provide appropriate synchronized action of the take-out head 270 at the point of take-out. Another, less critical, relationship is the positioning of the chamfered end 349 of the opening cam to effect the jaw opening operation while the take-out head is at its lowest elevation as controlled by the low dwell cam 158.

With respect to the cam track assembly 150, the pick-up cam 154 will normally occupy a permanently located position relative to the cam table 134. It is for this reason that the pick-up cam 154 is mounted upon the support 155, which may remain permanently in place on the cam table 134 regardless of substitution of the pick-up cam to accommodate different types and sizes of ware. Ordinarily, the conveyer will be so located as to receive the ware at a point not less than ninety degrees either way from the starting point of the take-out mechanism, and it is apparent that appropriate selection of the number and disposition of high dwell cams 153 and dwell cams 156 permits a wide choice of locations for the conveyer.

Considering the valve operating cam assembly 285, it is evident that the closing cam 338 may remain permanently located on its support 330. The opening cam, however, will be of a selected length to dispose its chamfered end 349 in an appropriate position to effect release of the ware at the desired point in the rotation of the carriage assembly 85. Thus, depending upon the position of the conveyer 475, a second cam 338 may be employed as the opening cam or a cam of greater length such as one of the cams 345 or 348 may be used. Actually, owing to the previously described provision for adjustment of the opening and closing cam, selection of an appropriate one of the three cams 338, 345, and 348 will permit release of the ware at any point that would ordinarily be chosen. It is, of course, desirable to maintain the overlapping relation between the opening and closing cam, but the provision for adjustment in the present illustration enables approximately a sixty degree relative movement between the opening and closing cams without disturbing the overlapping relationship.

It is obvious from the foregoing description, and particularly from the view of Fig. 18, that the opening and closing cams may be individually positioned with great accuracy by rotation of their respective adjusting shafts 356. Thus, the opening and closing movements of the take-out jaws 468 may be easily adjusted to meet the operating requirements above described, and the adjustment may be made while the mechanism 60 is in operation.

The shape of the finish of the ware, and particularly its elevation, may require particular attention to the height of the rotating assembly. As is apparent from the foregoing description, the support assembly 86 provides for easy and accurate vertical adjustment of not only the cam table 134 and the cam track assembly 150, but also of the rotatably supported carriage assembly 85, including the take-out heads 270 mounted thereon. Changes in the height of these parts are simply effected by loosening the screws 100 which clamp the upper end 97 of the base 87 to the screw member 115 and then turning the worm 122 by means of an appropriate wrench or crank applied to one of the nuts 126. This rotates the worm gear nut 120, thereby to raise or lower the screw 115, the latter being held from rotation by the key 117. The main drive shaft 275 is not moved during this vertical adjustment of the operating assembly, the splines 278 being of sufficient length to maintain continuous driving engagement with the drive flange 168 for any vertical adjustment within the limits of the machine. When an appropriate vertical adjustment has been made as described, the screws 100 are again tightened to maintain the adjustment.

As previously noted, the shape and dimensions of the take-out jaws 468 may be varied to suit the requirements of the particular ware to be handled. The speed of the opening and closing movements of these jaws may be controlled by proper adjustment of the needle valves 393. The particular valve 393 which controls the speed of the closing movement is adjusted along with adjustment of the closing cam support 330 to obtain proper timing, and also to insure closure of the jaws at a speed that will not cause the ware to be struck with excessive force.

The jaws 468 are prevented from over-closing by the stop screw 463, and may be individually adjusted by the eccentric studs 456.

One purpose of the brake assembly 180 is to insure a smooth rotative movement of the carriage assembly 85 by absorbing the lateral forces resulting from engagement of the cam roller 160 with the inclined portions of the cam track assembly 150, which would otherwise produce a tendency toward a jerky rotative movement of the carriage assembly 85. The brake assembly 180 has been previously described as retained against rotative movement in the table 134 and as acting upon the rotating brake disc 174. The force applied by the brake is proportional to the hydraulic pressure supplied thereto and may be controlled by any appropriate well known means.

It may be seen from the foregoing description that the several parts of the mechanism 60 may be assembled and disassembled with facility. Similar assemblies, as well as parts thereof, are completely interchangeable. All of the parts that require lubrication are readily accessible. Accurate operating adjustments are easily made during the operation of the machine. The operating fluid is confined from its introduction into the mechanism 60 until its exhaust therefrom in rigid, non-flexible passages formed in the metal parts of the mechanism. Appropriate means are provided for insuring a smooh rapid operation of the mechanism.

Clearly, the glassware take-out mechanism above described is well adapted to its intended use, and fully meets the objects and advantages sought therefor.

It will be understood that the foregoing description has been given by way of illustration and example. It will be further understood that changes in the form of the elements, rearrangement of parts and substitution of equivalent elements, which will be obvious to those skilled in the art, are contemplated as within the scope of the present invention which is limited only by the claims which follow.

What is claimed is:

1. In a machine for moving glassware, a base, a vertical shaft mounted on the base, a framework mounted on the shaft for rotation relative to the base, a plurality of ware engaging means mounted on the framework, each having a fluid pressure-operated power device for its operation, a plurality of valves mounted on the framework and connected to the power devices, and means for operating the valves in timed relation with rotation of the framework, including cam means mounted on the shaft above the framework and cam follower means leading radially therefrom to each valve.

2. In a machine for moving glassware, a base, a vertical shaft mounted on the base, a framework mounted on the shaft for rotation relative to the base, a plurality of ware engaging means mounted on the framework, each having a fluid pressure-operated power device for its operation, a plurality of valves mounted on the framework and connected to the power devices, means for operating the valves in timed relation with rotation of the framework, including cam means mounted on the shaft above the framework and cam follower means leading radially therefrom to each valve, fluid pressure supply means extending through the shaft from above the framework to a point therewithin, and distribution means within the framework connecting with the several valves.

3. In a machine of the kind described, a base, a vertical shaft rotatably mounted on the base, a framework mounted on the shaft, the framework comprising a lower disc connected for rotation with the shaft and vertically supported on the base, a central sleeve-like spacer disposed concentrically about the shaft and connected to the lower disc, an upper disc attached to the top of the spacer, a plurality of ware engaging means mounted on the framework between the upper and lower discs, each having a fluid pressure-operated power device for its operation, a plurality of valves mounted on the upper disc and connected to the power devices, means for operating the valves in timed relation with rotation of the framework, and fluid pressure supply means extending through the shaft from above the upper disc to a point within the upper disc, and distribution means within the upper disc connecting with the several valves.

4. In a machine of the kind described, a base, a hollow screw-like member mounted for vertical sliding movement in the base, a vertical shaft rotatably mounted in the screw-like member, a framework mounted for vertical sliding movement on the shaft, the framework comprising upper and lower discs interconnected by a sleeve-like spacer disposed concentrically about the shaft, the framework being vertically supported by the screw-like member, a slidable driving connection between the shaft and the framework, means for selectively raising and lowering the screw-like member and the framework supported thereby, a plurality of fluid pressure-operated engaging means mounted on the framework between the upper and lower discs, a valve for each ware engaging means mounted on the upper disc, a fluid passage extending from each of the valves to a common distribution chamber within the upper disc, a fluid passage in the shaft extending from above the upper disc to a point therebelow, and means including an elongated annular space between the shaft and the spacer for communicating the fluid passage in the shaft with the distributing chamber in the upper disc, said latter means being effective over a predetermined range of elevations of the framework relative to the shaft.

5. In a machine of the kind described, a base, a vertical column rising therefrom, a table-like stationary support mounted on the base and extending outwardly from the column, a framework mounted on the column above the stationary support for rotation on the base, vertically movable ware engaging means mounted on the framework, a cam track on the stationary support outside the framework, cam track follower means connected for operation of the ware engaging means and movable on the cam track, valve means on the framework for controlling the ware engaging means, cam means mounted on the column and supported by the framework, means restraining the cam means against rotation with the framework, and cam follower means engaging the valve means and engageable with the cam means for operation of the valve means during rotation of the framework, the framework being rotatably supported on the stationary member, means for vertically adjusting the stationary member on the base, and air distribution means including a slidable air passage connection within the framework to permit vertical adjustment of the latter without interfering with the distribution of air.

6. In a machine of the kind described, a base, a rotatable carriage on the base, the carriage having spaced disc members, a pair of parallel columns connecting the disc members, a take-out head having spaced sleeves engageable slidably on the respective columns for sliding movement thereon, take-out means on the head, a reversible fluid motor on the head for operating the take-out means, a passage in each column, passage means in the head for communicating said column passages respectively to opposite ends of the fluid motor, a valve mounted on one of the disc members, a plurality of passages within said one of the disc members, said disc passages including non-intersecting passages from the valve to the respective column passages, and means to reverse the connections through the valve control during rotation of the carriage.

7. In a machine of the kind described, an upstanding support, a hollow screw-like member mounted for vertical movement in the support, a rotatable shaft in fixed vertical relation to the support and extending through the screw-like member, a lateral support for the shaft in fixed relation to the support and engaging the shaft substantially above the screw-like member, a carriage rotatably supported by the screw-like member and in slidable interlocking engagement with the shaft, take-out heads mounted for vertical movement on the carriage, cam track means mounted on the screw-like member, cam track follower means mounted on each take-out head and in following engagement with the cam track means for effecting movement of the take-out heads during rotation of the carriage, fluid pressure-operated ware holding means on each take-out head, a valve for each ware holding means mounted on the carriage, fluid passages between the respective valves and the ware holding means, said passages including slidable connections between the carriage and the take-out heads, fluid distribution passages within the carriage communicating the several valves with a common fluid distribution chamber also within the carriage, a fluid supply passage in the shaft, a slidable connection within the carriage communicating the fluid supply passage with the fluid distribution chamber, cam means supported on the carriage so as to be non-rotatable therewith and in non-interlocking engagement with the shaft, a slidable connection between the cam means and the lateral support for the shaft for maintaining the cam means stationary during rotation of the carriage, brake means supported on the carriage and retained against rotation by the screw-like member, and means in the support for adjusting the carriage, the cam track means, the cam means, and the brake means vertically relative to the support.

8. In a machine of the kind described, a base, a vertical shaft rotatably mounted in the base, a non-rotatable member mounted for vertical movement relative to the base and to the shaft, a carriage rotatably supported on the non-rotatable member and having a slidable interlocking connection to the shaft, said carriage comprising a disc connected to a hollow spacer, fluid pressure-operated takeout means mounted on said carriage, a fluid distribution system for operating the take-out means, said system comprising a plurality of fluid passages in the disc, a fluid supply passage in the shaft, and means intercommunicating said plurality of fluid passages and said fluid supply passage, said latter means comprising an elongated passage in the spacer having fixed fluid communication with the disc and adapted to maintain movable fluid connection with the shaft, and means for adjusting the carriage vertically relative to the shaft.

9. In a machine of the kind described, a base, a vertical shaft rotatably mounted in the base, a non-rotatable member mounted for vertical movement relative to the base and to the shaft, a carriage rotatably supported on the non-rotatable member and having a slidable interlocking connection to the shaft, take-out means mounted on the carriage for rotation therewith, said take-out means including a take-out head mounted between the discs for vertical movement relative to the carriage, cam track means secured to the stationary member and engaging the take-out head for effecting vertical movement of the latter upon rotation of the carriage, fluid pressure-operated ware engaging means on the take-out head, a valve for controlling the operation of the ware engaging means, said valve being mounted on the upper disc and having a flexible fluid connection with the take-out head, cam means supported on the carriage so as to be non-rotatable therewith, said cam means being disposed above the upper disc of the carriage, means slidably interconnecting the cam means with the base for restraining the cam means from rotation, cam follower means mounted on the upper disc for operatively interengaging the valve with the cam means upon rotation of the carriage, said cam track means and said cam means each having inclined surfaces tending to produce undesirable relative rotative movement between the shaft and the carriage, and brake means for absorbing the net tendency to produce such relative movement in at least one direction, said latter means comprising a first braking element disposed below the lower disc and connected thereto for movement therewith and a second braking element slidably supported by the first braking element, said second braking element engaging also the nonrotatable member whereby to be restrained from rotation, and means for adjusting the carriage, the non-rotatable member, and the brake means vertically relative to the shaft.

10. In a machine of the kind described, an upstanding base, a support mounted for vertical movement in the base, means keying the support against rotative movement in the base, a vertical shaft rotatable in the support and extending thereabove, means restraining the shaft against vertical movement, a carriage slidably connected to the shaft for rotation therewith, said carriage being rotatably supported on the support for vertical movement therewith, said carriage comprising a hollow spacer concentric with the shaft and a disc secured to the top of the spacer, fluid pressure-operated take-out means mounted on the carriage including a valve mounted on the disc, fluid passage means in the shaft and in the disc for supplying the valve with fluid pressure, said fluid passage means comprising a fluid supply passage in the shaft extending from above the carriage to an outlet disposed within the hollow spacer, a restriction within the spacer below said outlet for slidable sealing engagement with the shaft, an annular chamber in the disc communicating with the interior of the hollow spacer, means in the disc above the annular chamber for slidable sealing engagement with the shaft and a fluid passage in the disc communicating the annular chamber with the valve, and means for adjusting the carriage vertically relative to the shaft.

11. In a machine of the kind described, an upstanding base, a support mounted for vertical movement in the base, means keying the support against rotative movement in the base, a vertical shaft rotatable in the support and extending thereabove, means restraining the shaft against vertical movement, a carriage slidably connected to the shaft for rotation therewith, said carriage being rotatably supported on the support for vertical movement therewith, cam operated takeout means mounted for rotation with the carriage, a cam mounted on the support for engagement with the cam operated take-out means, said engagement being adapted to produce an undesired tendency for the carriage to rotate faster than the shaft, and brake means for overcoming said tendency comprising a horizontally disposed circular disc secured to the carriage for rotation therewith, and means for gripping the upper and lower surfaces of the disc adjacent the periphery thereof, said means being slidably supported by the disc and in rotation restraining engagement with the support, and means for adjusting the brake means and the support vertically relative to the shaft and the base.

12. In a machine of the kind described, a cam assembly comprising a non-rotatable base member having a horizontally extending flange and a horizontal annular ledge, said ledge being spaced below said flange, a first annular cam support rotatably supported on the ledge, said first support having a horizontal annular surface, a second annular cam support rotatably supported on the annular surface, a cam removably secured to the periphery of each cam support, and means for adjusting the cams individually relative to the base member, said latter means comprising a pilot member and a pivot member for each cam, said pilot member being pivotally mounted in the respective cam supports and having head portions disposed in substantial abutment with the lower surface of the flange of the base member, said pivot members being pivotally mounted in the flange and having head portions in substantial abutment with the lower surface thereof, and an adjusting shaft rotatably secured against longitudinal movement in each of the pivot members and threadedly engaging a respective pilot member.

13. A machine for moving glassware and the like, comprising a base, a rotatable support on the base, means including interlocking elements for continuously rotating the support, a ware engaging device mounted for rotative movement with the support and for vertical movement relative to the support, releasable gripping means on the ware engaging device, means for effecting vertical movement of the ware engaging device during rotation of the rotatable support, and cam means including an adjustable cam assembly for operating the gripping means during rotation of the rotatable support, said adjustable cam assembly being supported by the rotatable support for relative horizontal movement therebetween and being in motion restraining engagement with the base.

14. The machine of claim 13 wherein the adjustable cam assembly has rotative engagement with the support and slidable engagement with the base.

15. The machine of claim 14 wherein the adjustable cam assembly comprises a non-rotatable cap member and a pair of concentric rotatable cam supports, and adjusting means extending from the cap member individually to each cam support for positioning the latter relative to the base.

16. A machine for moving glassware and the like, comprising a base, an upstanding shaft mounted for rotation in the base, a carriage assembly movably interlocked with the shaft for rotation therewith, a plurality of ware engaging devices mounted for movement on the carriage, cam means active between the base and the carriage for operating the ware engaging devices during rotation of the carriage, said means being effective to bias the carriage intermittently toward rotation tending to overrun the upstanding shaft, and brake means active directly between the base and the carriage for absorbing said biasing force.

17. The machine of claim 16 wherein the base comprises a main stationary support and an auxiliary movable support, said movable support being coaxial with the upstanding shaft, the carriage being rotatably mounted on said movable support, means for adjusting said movable support and the carriage mounted thereon to various elevations, said brake means being slidably supported on said carriage and thereby adapted to move vertically therewith while at the same time maintaining engagement with the support.

References Cited in the file of this patent

UNITED STATES PATENTS 2,609,943    Winder ______________ Sept. 9, 1952

FOREIGN PATENTS 661,573    Great Britain __________ Nov. 21, 1951